US 12,113,435 B2

(12) United States Patent
Rehlaender et al.

(10) Patent No.: US 12,113,435 B2
(45) Date of Patent: Oct. 8, 2024

(54) ACTIVE-CLAMP FORWARD CONVERTER WITH REGENERATIVE SNUBBER

(71) Applicant: Delta Electronics (Thailand) Public Co., Ltd., Samutprakarn (TH)

(72) Inventors: Philipp Rehlaender, Paderborn (DE); Bastian Korthauer, Zürich (CH); Frank Schafmeister, Warburg (DE); Joachim Böcker, Berlin (DE)

(73) Assignee: Delta Electronics (Thailand) Public Co., Ltd., Samutprakarn (TH)

( * ) Notice: Subject to any disclaimer, the term of this patent is extended or adjusted under 35 U.S.C. 154(b) by 171 days.

(21) Appl. No.: 17/806,261

(22) Filed: Jun. 9, 2022

(65) Prior Publication Data

US 2022/0399804 A1 Dec. 15, 2022

(30) Foreign Application Priority Data

Jun. 9, 2021 (EP) .................................... 21178635

(51) Int. Cl.
*H02M 3/335* (2006.01)
*H02M 1/34* (2007.01)
*H02M 3/00* (2006.01)

(52) U.S. Cl.
CPC ............. *H02M 1/342* (2021.05); *H02M 3/01* (2021.05); *H02M 3/33571* (2021.05); *H02M 3/33592* (2013.01)

(58) Field of Classification Search
CPC .... H02M 1/342; H02M 3/33571; H02M 3/01; H02M 3/33592
See application file for complete search history.

(56) References Cited

U.S. PATENT DOCUMENTS

| 7,342,811 B2 * | 3/2008 | Domb ............... | H02M 3/33592 363/21.06 |
| 10,097,100 B1 * | 10/2018 | Xue .................. | H02M 3/33592 |
| 10,291,141 B1 * | 5/2019 | Xue .................. | H02M 3/33592 |
| 10,461,626 B1 | 10/2019 | Radic | |

(Continued)

OTHER PUBLICATIONS

Zaikin Denys I: "Boundary conduction mode buck converter as regenerative snubber for center-tapped rectifier", 2017 11th IEEE International Conference on Compatibility, Power Electronics and Power Engineering (CPE-Powereng), IEEE, Apr. 4, 2017 (Apr. 4, 2017), pp. 187-192.

(Continued)

*Primary Examiner* — Adolf D Berhane
(74) *Attorney, Agent, or Firm* — CKC & Partners Co., LLC (57) ABSTRACT

A power converter-circuit (100) having a transformer (T), comprising a snubber-circuit ($C_{sn}$, $D_{Sn,S3}$, $S_3$, $D_{Sn,S4}$) for suppressing voltage peaks on a secondary side of the transformer (T) that comprises a snubber capacitor ($C_{sn}$); and an auxiliary DC-DC converter (101) having a first input connected with the snubber capacitor ($C_{sn}$) and a first output connected with a first output ($V_{Out}$) of the power converter-circuit (100). This circuit increases efficiency of electrical conversion and reduces thermal losses.

16 Claims, 10 Drawing Sheets

(56) References Cited

U.S. PATENT DOCUMENTS

| | | |
|---|---|---|
| 11,848,617 B2 * | 12/2023 | Jitaru ................ H02M 3/33507 |
| 2001/0009516 A1 | 7/2001 | Kato |
| 2006/0268585 A1 | 11/2006 | Domb et al. |
| 2024/0055980 A1 * | 2/2024 | Xie .................... H02M 1/0038 |

OTHER PUBLICATIONS

Corresponding European Search Report mailed on Nov. 9, 2021.
The first Office Action of corresponding European application No. 21178635.5, dated Jul. 24, 2024.
Rais Miftakhutdinov, Texas Instruments Incorporated, "Optimal design for an interleaved synchronous buck converter under high-slew-rate, load-current transient conditions", Feb. 1, 2001, XP093186705, 6 pages.

\* cited by examiner

ACTIVE-CLAMP FORWARD CONVERTER WITH REGENERATIVE SNUBBER

CROSS-REFERENCE TO RELATED APPLICATIONS

This application claims priority to European Patent Application No. 21178635.5, filed on Jun. 9, 2021, which is hereby incorporated by reference in its entirety.

TECHNICAL FIELD

The disclosure relates to a power converter-circuit having a transformer, including a snubber-circuit for suppressing voltage peaks on a secondary side of the transformer that includes a snubber capacitor. Further the disclosure relates to a method for converting voltage, including the step of suppressing voltage peaks on a secondary side of the transformer with a snubber circuit that includes a snubber capacitor.

BACKGROUND ART

Document US 2001/0009516 A1 discloses an active clamp forward converter for reducing the charging voltage of clamp capacitors as well as the voltage applied to switching elements. The active clamp forward converter includes first and second FETs which respectively connects first and second ends of a primary coil of the transformer to positive and negative terminals of a direct current power supply, and third and fourth FETs which respectively connects the first and second ends to the negative and positive terminals of a direct current power supply via capacitors, where the pair of first and second FETs and the pair of third and fourth FETs are alternately switched on and off sandwiched about a period when both are off.

Document U.S. Pat. No. 10,461,626 B1 discloses an active clamp circuit that includes an active clamp switch having a drain node and a source node, an active clamp capacitor coupled in a series combination with the active clamp switch, a delay circuit, and an active clamp controller circuit coupled to the active clamp switch and to the delay circuit. The active clamp controller circuit is configured to receive an active clamp switch voltage based on a voltage developed across the drain node and the source node of the active clamp switch, enable the active clamp switch based on a voltage amplitude of the active clamp switch voltage, and disable the active clamp switch based on a delay signal generated by the delay circuit.

Due to their low losses at a high blocking voltage, silicon-carbide based switches enable the active-clamp forward converter (ACFC) as a suitable on-board 400V-12V power converter for electric vehicles. Considering the large output current, synchronous rectification is done with Silicon-MOSFETs on the secondary side. However, these MOSFETs come with a non-negligible output capacitance. As the rectification is placed directly on the transformer secondary side, the output capacitance resonates with the transformer leakage inductor, yielding a high voltage overshoot. It can be observed that this overshoot becomes approx. 2.5 times larger than the steady-state blocking voltage, which is a consequence of the voltage dependency of the capacitance. Moreover, the voltage spike exceeds the 100V voltage limit of the synchronous rectifiers resulting in large avalanche losses. Consequently, the converter operation at high- or even intermediate-load conditions is not possible. Dissipative snubbers like the RCD-snubber are commonly used to clamp such voltage spikes. However, the large amount of energy stored in the leakage inductor can lead to a power of 20 W to be dissipated by the snubber. This causes a dramatic heat development in the snubber resistor and decreases the efficiency of the ACFC.

Ringing of the secondary blocking voltage is not solely a problem of ACFCs. Although lossless snubber topologies are principally known neither of these methods is suitable for high-power ACFCs. Additional components in the power path can be used, but often suffer from a high component count and limited discharge possibilities for the snubber capacitor.

SUMMARY

It is the object of the disclosure to limit voltage overshoots at synchronous rectifiers of a power converter circuit.

The solution of the disclosure is specified by a power converter-circuit having the features according claim 1.

According to the disclosure the solution is achieved by a power converter-circuit having a transformer, including a snubber-circuit for suppressing voltage peaks on a secondary side of the transformer that includes a snubber capacitor; and an auxiliary DC-DC converter having a first input connected with the snubber capacitor and a first output connected with a first output of the power converter-circuit. This creates a regenerative snubber topology for an ACFC, which can also be applied to a variety of other PWM-based power converters. The power converter utilizes an auxiliary DC-DC converter to control the regenerative snubber voltage of the snubber capacitor on secondary side and, thus, the maximum reverse blocking voltage. Further, it comes with a lower component count compared to other topologies. Thereby it is possible to regenerate energy stored in a capacitance of the snubber with low number of components.

In a preferred embodiment of the power converter-circuit the power converter-circuit is a DC-DC converter or a PWM-based DC-DC converter. A DC-DC converter is an electronic circuit that converts a source of direct current (DC) from one voltage level to another. It is a type of electric power converter. Power levels may range from extremely low, such as in small batteries, to very high, such as in high-voltage power transmission. A PWM converter (Pulse-Width Modulation converter) is an electronic circuit that reduces the average power delivered by an electrical signal, by effectively chopping it up into discrete parts. These circuits yield the technical benefit that voltages can be converted accordingly with high efficiency.

In a further preferred embodiment of the power converter circuit, the power converter circuit is an Active Clamped Forward Converter. The active clamping circuit is arranged on a primary side of the transformer, thus forming an Active Clamped Forward Converter. The active clamping circuit is a circuit for controllably storing energy from a leakage inductance of the transformer. Active clamping the inductor serves to absorb the back-EMF energy incurred by the turn-off of a low-side switch. This active clamping can eliminate the need for freewheeling diodes (FWDs) that return back-EMF energy to a power supply. This yields the technical benefit that efficiency of the circuit can be increased by active clamping the inductance of the transformer.

In a further preferred embodiment of the power converter-circuit the auxiliary DC-DC converter is a buck-converter. The buck converter is a DC-to-DC power converter which steps down voltage while drawing less average current from its input to its output. It is a class of switched-mode power supply (SMPS) typically containing at least two semiconductors, such as a diode and a transistor. This yields the technical benefit that efficient regeneration of snubber energy can be realized with a low number of electric components.

In a further preferred embodiment of the power converter-circuit the buck-converter includes a transistor and a diode for controlling the current in an inductor. This also yields the technical benefit that efficient regeneration of snubber can be realized with few electric components.

In a further preferred embodiment of the power converter-circuit the buck-converter is a synchronous buck converter including a synchronous rectifier. A synchronous buck converter is a modified version of the basic buck converter-circuit topology in which a second switch is used for rectifying instead of a diode. This yields the technical benefit that efficiency of the circuit can be further increased. On the other hand, robustness on overvoltage spikes is reduced for synchronous buck converters due to the second active switch replacing the passive diode.

In a further preferred embodiment of the power converter-circuit the buck converter is a multiphase buck converter in which several buck converter circuits are placed in parallel between its input and its output. The multiphase buck converter is a circuit topology in which basic buck converter circuits are placed in parallel between the input and the output. Each of the n phases is turned on at equally spaced intervals over the switching period. This circuit is typically used with the synchronous buck topology. This yields the technical benefit that load changes can be handled faster.

In a further preferred embodiment of the power converter-circuit a second input of the auxiliary DC-DC converter is connected with the ground potential. The ground potential provides a low-impedance path to the earth. This yields the technical benefit that the reference voltage can be kept stable.

In a further preferred embodiment of the power converter-circuit a second output of the auxiliary DC-DC converter is connected with the ground potential. This also yields the technical benefit that that the reference voltage can be kept stable.

In a further preferred embodiment of the power converter-circuit at least one synchronous rectifier for rectifying an output voltage of the power converter-circuit is arranged on the secondary side. A synchronous rectifier improves the efficiency of rectification by replacing diodes with actively controlled switches, usually power MOSFETs or power bipolar junction transistors. Whereas normal semiconductor diodes have a roughly fixed voltage drop of around 0.5-1 volts, active rectifiers behave as resistances, and can have arbitrarily low voltage drop. This yields the technical benefit that efficiency of the circuit can be further increased.

According to the disclosure the solution is also achieved by a converting method, including the steps of suppressing voltage peaks on a secondary side of the transformer with a snubber circuit that includes a snubber capacitor; and returning energy from the snubber capacitor to a first output of the power converter-circuit by means of an auxiliary DC-DC converter having a first input connected with the snubber capacitor and a first output connected with the first output of the power converter-circuit. By this method same technical benefits can be achieved as with the aforementioned power converter circuit.

In a preferred embodiment of the method the converter circuit is an Active Clamped Forward Converter. In this way energy from a leakage inductance of the transformer is stored by a controllable active clamping circuit on the primary side of the transformer. This also yields the technical benefit that efficiency of the circuit can be increased by actively clamping the main inductance of the transformer.

In a further preferred embodiment of the method the voltage of the snubber capacitor is controlled by the auxiliary DC-DC converter. This yields the technical benefit that voltage peaks can be suppressed efficiently.

In a further preferred embodiment of the method the current in an inductor of the auxiliary DC-DC converter is controlled by a transistor and a rectifier. This also yields the technical benefit that efficient regeneration of snubber energy can be realized with few electric components.

In a further preferred embodiment of the method a rectifying of an output voltage of the power converter-circuit is performed by at least one synchronous rectifier arranged on the secondary side. This yields the technical benefit that efficiency of the circuit can be further increased.

Other advantageous embodiments and combinations of features come out from the detailed description below and the entirety of the claims.

BRIEF DESCRIPTION OF THE DRAWINGS

The drawings used to explain the embodiments show.

In the figures, the same components are given the same reference symbols.

PREFERRED EMBODIMENTS

Silicon-carbide (SiC) switches enable an active-clamp forward converter to function as a suitable topology for large output powers. One problem of this topology, however, is that it is a single-pulse topology, in which a synchronous rectifier is directly placed on the secondary side of the transformer. The synchronous rectifier is non-ideal and has for example a significant output capacitance that resonates with a transformer's stray inductor.

In a 2.2 kW onboard DC-DC power converter, this resonance leads to an overshoot of approximately three times the steady-state blocking voltage. Furthermore, the large energy stored in the stray inductor results in a power of approximately 20 W. Therefore, typical passive snubbers cannot be used for reasons of efficiency and power dissipation. Further, the active clamp converter cannot be operated in reverse operation since it is a unidirectional topology. The problem lies in the output inductor, which cannot be demagnetized in reverse operation.

Figure 1:
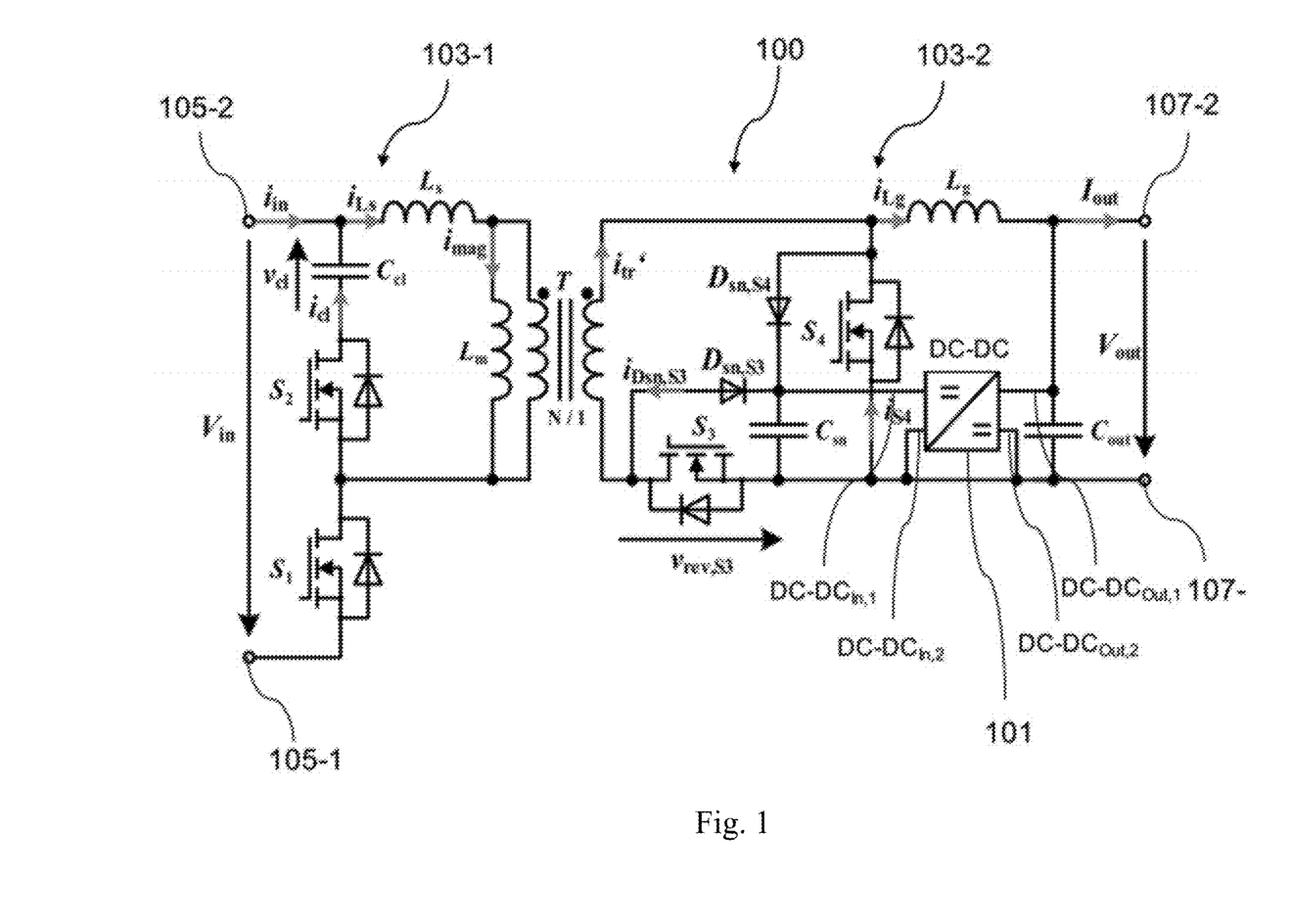
FIG. 1 shows an improved ACFC circuit with a regenerative snubber on a secondary side.

FIG. 1 shows an improved active clamping forward power converter-circuit 100 (ACFC circuit). The forward converter 100 is a DC/DC converter that uses a transformer T to increase or decrease the output voltage $V_{Out}$ in relation to the input voltage $V_{In}$ (depending on the transformer ratio N/1) and provide galvanic isolation for the load. With multiple output windings, it is possible to provide both higher and lower voltage outputs simultaneously.

The ACFC circuit 100 includes a primary side 103-1 and a secondary side 103-2. The primary side 103-1 includes two input terminals 105-1 and 105-2 to which the DC input voltage $V_{In}$ is supplied. MOSFET switch $S_1$ is controlled to periodically interrupt the input DC voltage $V_{In}$. When $S_1$ is turned on current $i_{in}$ flows through the inductivities $L_s$ and $L_m$ of the transformer T. $L_s$ is the leakage inductor of the transformer T causing current $i_{Ls}$. The leakage inductor $L_s$ derives from the electrical property of the imperfectly coupled transformer T in which each winding behaves as a self-inductance in series with the winding's respective ohmic resistance constant.

$L_m$ is the mutual inductor of the transformer causing current $i_{mag}$. The mutual inductor $L_m$ is the property of the primary coil due to which it opposes the change of current in the secondary coil. When the current in the primary coil changes, the magnetic flux sets up in the primary coil and because of this, changing flux is induced in the secondary coil. By periodically switching on and off switch $S_1$ the varying magnetization of the primary coil is generated. While switch $S_1$ is switched on, the other MOSFET switch $S_2$ is switched off.

However, when switch $S_1$ is switched off, remaining magnetization is still existent in the transformer T. Therefore, subsequently switch $S_2$ is turned on by a suitable control circuitry, to allow flowing of clamping current $i_{cl}$ for demagnetizing the coil and charging the capacitor $C_{cl}$. This clamping current $i_{cl}$ is caused by the self-inductance of the primary coil of the transformer T when the current in the coil itself is stopped by switching off $S_1$. In the case of self-inductance, the magnetic field created by a changing current in the coil itself induces a voltage in the circuit. In this way capacitor $C_{cl}$ is fed with energy that comes from the transformer T when $S_1$ is switched off so that the voltage $V_{Cl}$ across the clamping capacitor Cc, rises.

Active clamping of the inductivities $L_s$ and $L_m$ is a protective function to absorb the back-EMF energy incurred by the turn-off of the low-side switch $S_1$. Active clamping also eliminates the need for freewheeling diodes (FWDs) that return back-EMF energy to a power supply and increases efficiency of the power converter circuit.

The secondary side 103-2 of the ACFC circuit 100 is connected with the secondary coil of the transformer T. The secondary side 103-2 includes two output terminals 107-1 and 107-2 to which the DC output voltage $V_{Out}$ of the ACFC circuit 100 is supplied. The secondary side 103-2 further includes the output inductor $L_g$ and the output capacitor $C_{out}$ that in combination form a low pass filter. Switches $S_3$ and $S_4$ constitute synchronous rectifiers that effectively act as diodes on the secondary side 103-2 of the ACFC circuit 100. Synchronous rectifiers improve the efficiency of rectification by replacing diodes with the actively controlled switches $S_3$ and $S_4$, usually power MOSFETs or power bipolar junction transistors. Whereas normal semiconductor diodes have a roughly fixed voltage drop of around 0.5-1 volts, active rectifiers behave as resistances, and can have arbitrarily low voltage drop. This yields the technical benefit that efficiency of the circuit can be further increased.

When switch S, is turned on, the DC input voltage $V_{In}$ is applied to the primary winding and simultaneously a scaled voltage appears across the transformer T secondary winding and current $i_{In}'$ flows through the secondary coil and current $i_{Lg}$ into inductor $L_g$. The dotted sides of both the windings have positive polarity. Synchronous rectifier $S_3$ is connected in series with the secondary winding and the scaled input voltage is applied to the low pass filter including output inductor $L_g$ and the output capacitor $C_{out}$. The primary winding current enters through its dotted end while the secondary current comes out of the dotted side and their magnitudes are inversely proportional to their turns-ratio.

When switch $S_1$ is turned off, the primary as well as the secondary winding currents are suddenly brought down to zero. However, current continuous through the output inductor $L_g$ and output voltage $V_{Out}$ continues without any abrupt change. Synchronous rectifier $S_4$ enables the freewheeling path for this current $I_{Out}$. During freewheeling the current $I_{Out}$ of the Output inductor $L_g$ tends to decay, but the presence of relatively large output capacitor Cut still maintains the output voltage $V_{Out}$ nearly constant and keeps ripple in the output voltage low. The supply switching frequency is chosen as high that the next turn-on of the switch $S_1$ takes place before the current of the output inductor $L_g$ decays significantly.

In a conventional active-clamp forward converter 100 the output inductor $L_g$ essentially decouples the capacitor $C_{out}$ at the output of the forward converter 100 from the parasitic output capacitors of the rectifier switches $S_3$ and $S_4$. This results in large overshoots in the blocking voltage such that the MOSFETs in switches $S_3$ and $S_4$ need to be designed for much larger blocking voltages. $V_{rev, S3}$ denotes the steady-state blocking voltage of switch $S_3$. The overshoots of the blocking voltage can be as high as three times the stationary blocking voltage. When an additional RC or RCD snubber is applied to reduce these overshoots, the energy of the overshoot is transferred to the snubber capacitor $C_{sn}$. Then, the snubber capacitor $C_{sn}$ could be discharged over a resistor in the conduction phase of the rectifier. However, this would result in large thermal losses.

However, here a regenerative snubber circuit $C_{sn}$, $D_{Sn,S3}$, $D_{Sn,S4}$ on the secondary side 103-2 of the transformer T with a galvanically-coupled auxiliary DC-DC converter 101 is used. Diodes $D_{Sn,S3}$, $D_{Sn,S4}$ are connected with the snubber capacitor $C_{sn}$. The snubber capacitor $C_{sn}$ helps to suppress peak voltage and minimize ringing. The auxiliary DC-DC converter 101 has two input terminals DC-$DC_{In,1}$ and DC-$DC_{In,2}$ and two output terminals DC-$DC_{Out,1}$ and DC-$DC_{Out,2}$.

The input DC-$DC_{In,1}$ of the auxiliary DC-DC converter is connected to the snubber capacitor $C_{sn}$ and the output DC-$DC_{Out,1}$ of the auxiliary DC-DC converter is connected to the output of the active-clamp forward converter 100. Thereby the rectifier voltage is effectively clamped to the output voltage Vout of the auxiliary DC-DC converter 101 and the energy of the oscillations is transferred regeneratively to the output of the active-clamp converter 100.

This circuit utilizes a small number of components, like two low-power MOSFETs and one single inductor and does not rely on components in the power path of the active-clamp converter 100. Large clamping capacitors can be used to mitigate oscillations such that rectifier switches of a small blocking voltage can be applied. This regenerative snubber topology uses active components and is able to increase the efficiency of the forward converter 100 by up to 0.2% while allowing the usage of cost-effective synchronous rectifiers with a blocking voltage of 80V in contrast to the former used 100V MOSFETs.

Figure 2A:
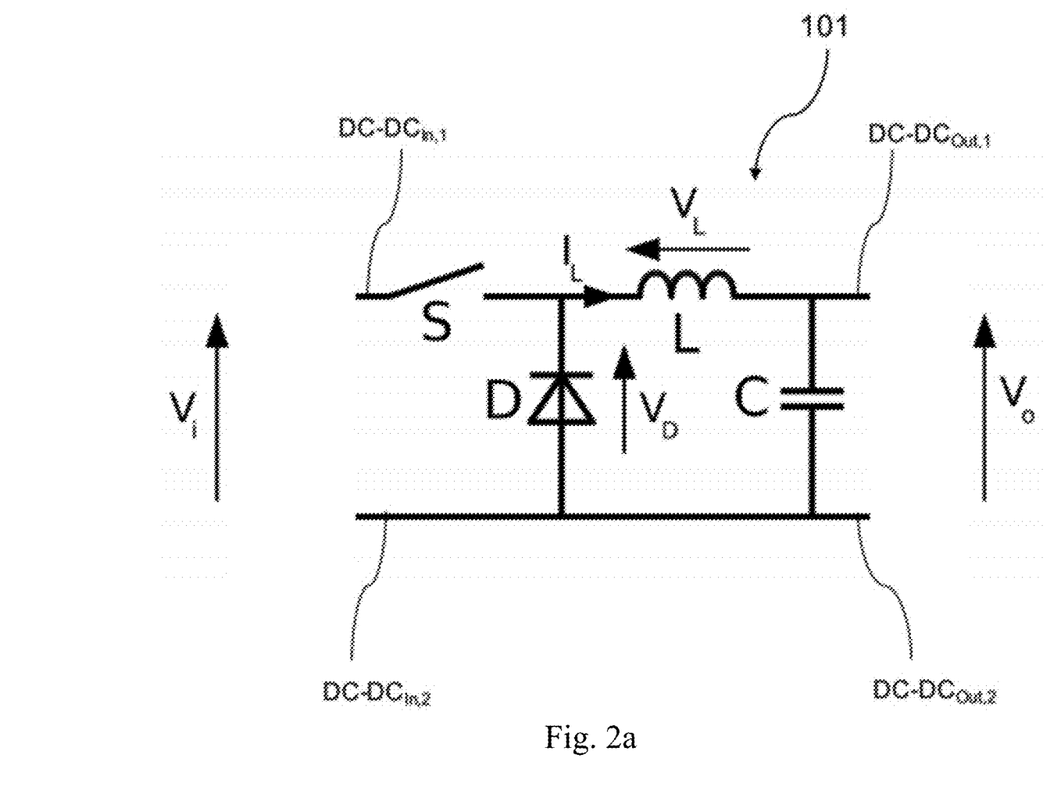
FIG. 2a and FIG. 2b show diagrams of a buck converter circuit.
Figure 2B:
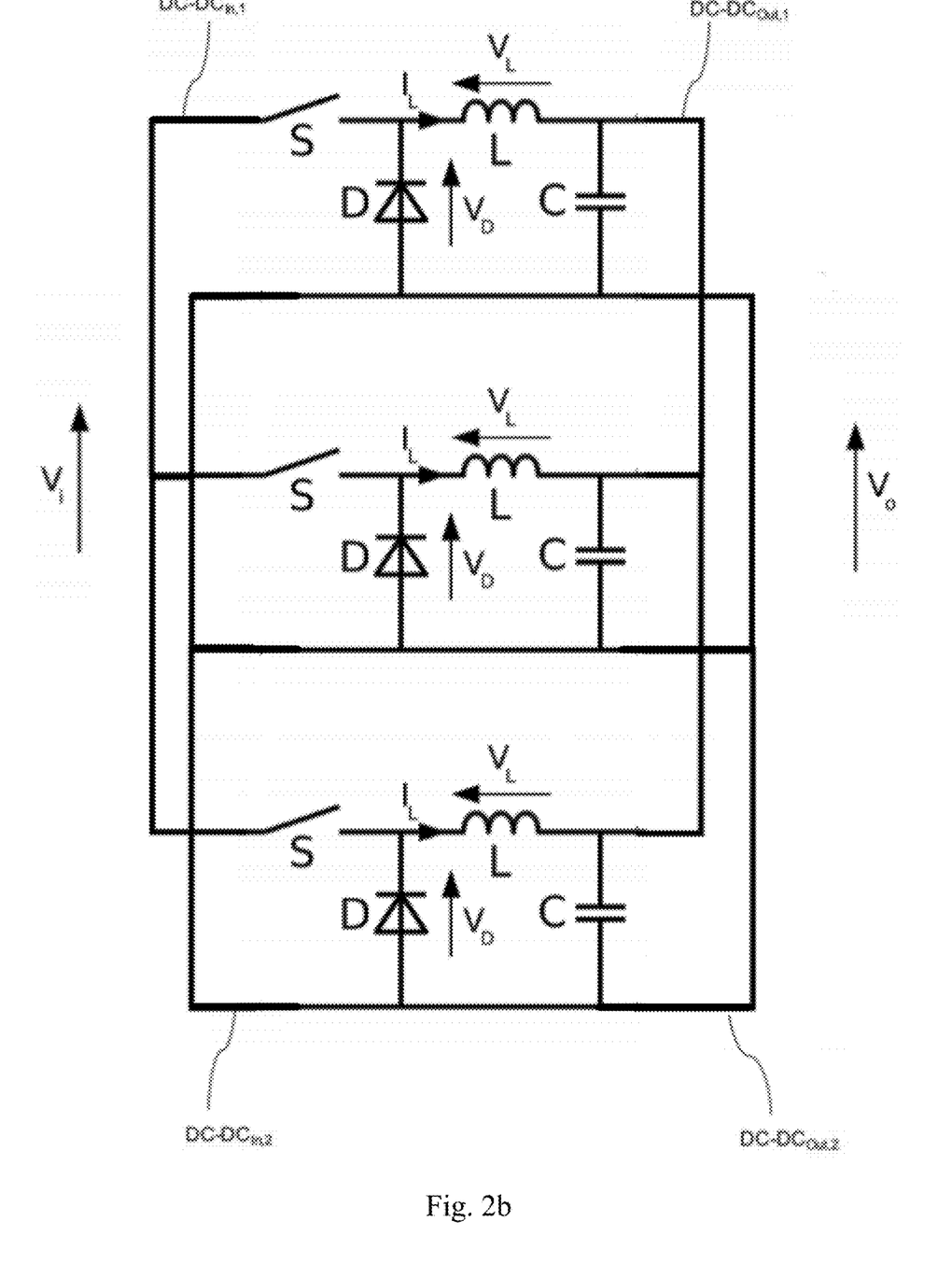

FIG. 2a and FIG. 2b show diagrams of a buck converter-circuit 101 as an auxiliary DC-DC converter. The buck converter circuit 101 is a DC-to-DC power converter which steps down input voltage $V_i$ while drawing less average current from its input to its output. The buck converter circuit 101 includes a freewheel diode D, a switch S and a low pass filter having an inductor L and a capacitor C. The buck converter circuit 101 operates in continuous mode if the current $I_L$ through the inductor L never falls to zero during a commutation cycle. The input voltage $V_i$ is supplied by the snubber capacitor $C_{sn}$ that acts as a voltage source.

When the switch S is closed, the voltage across the inductor is $V_L=V_i-V_O$. The current $I_L$ through the inductor L rises linearly in approximation, as long as the voltage drop is almost constant. As the diode D is reverse biased by the voltage source $V_i$, no current flows through it. $V_D$ is the voltage drop across the diode D.

When the switch S is opened, the diode D is forward biased. The voltage across the inductor L is $V_L=-V_O$ (neglecting diode drop) and the current $I_L$ decreases.

Although the auxiliary DC-DC converter 101, as shown in FIG. 2a, is described as a regular buck converter circuit 101 numerous other DC-DC-converter circuits may be used. For example, the auxiliary DC-DC converter 101 can be a synchronous buck converter including a synchronous rectifier instead a diode D or a multiphase buck converter, as shown in FIG. 2b, in which several buck converter circuits are placed in parallel between its input and its output.

Figure 3:
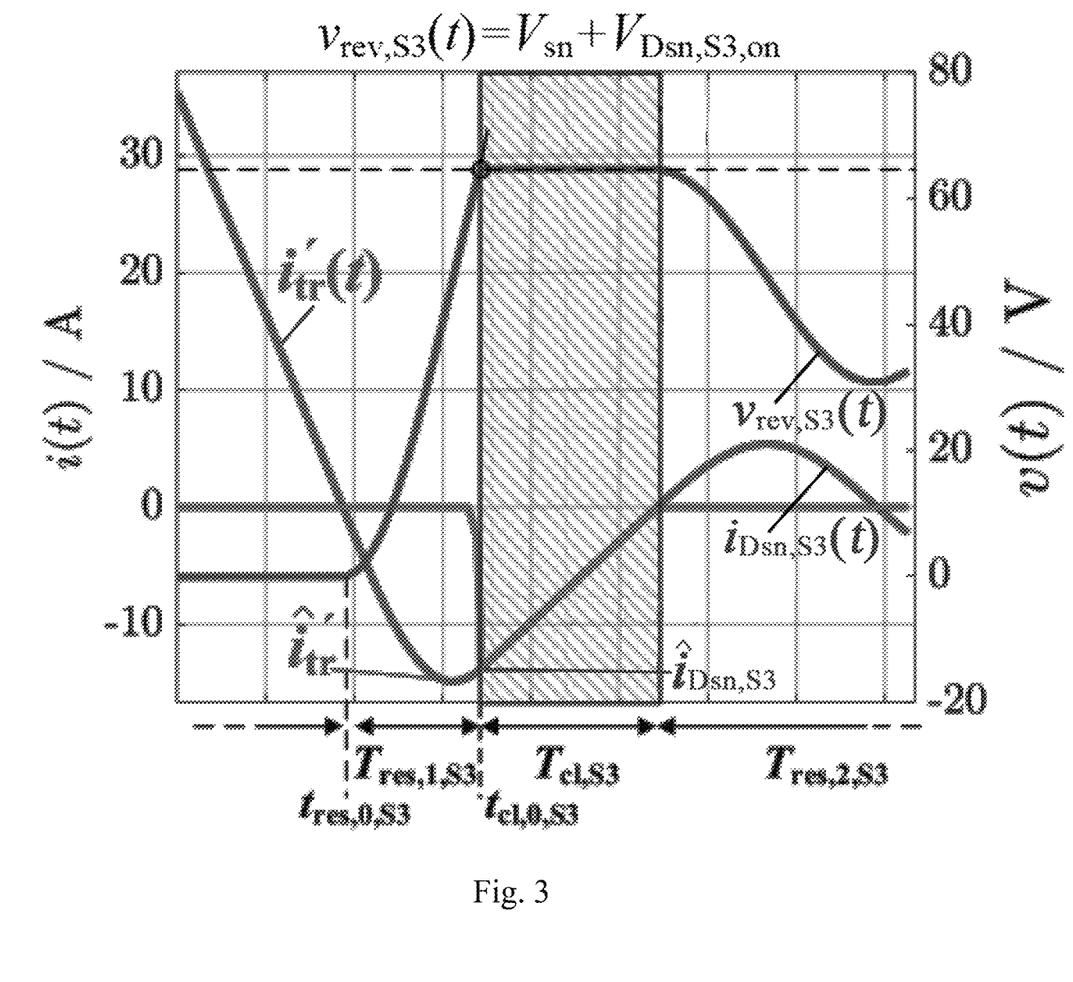
FIG. 3 shows a principle of operation of the regenerative snubber.
Figure 4:
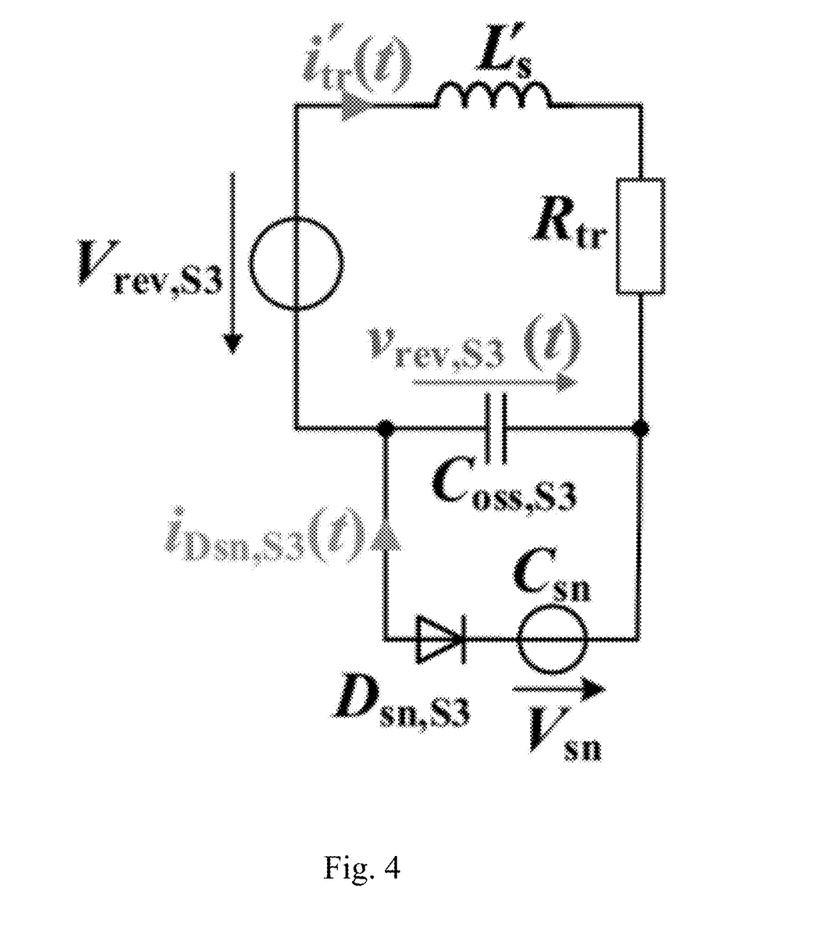
FIG. 4 shows an equivalent circuit in a resonant phase.
Figure 5:
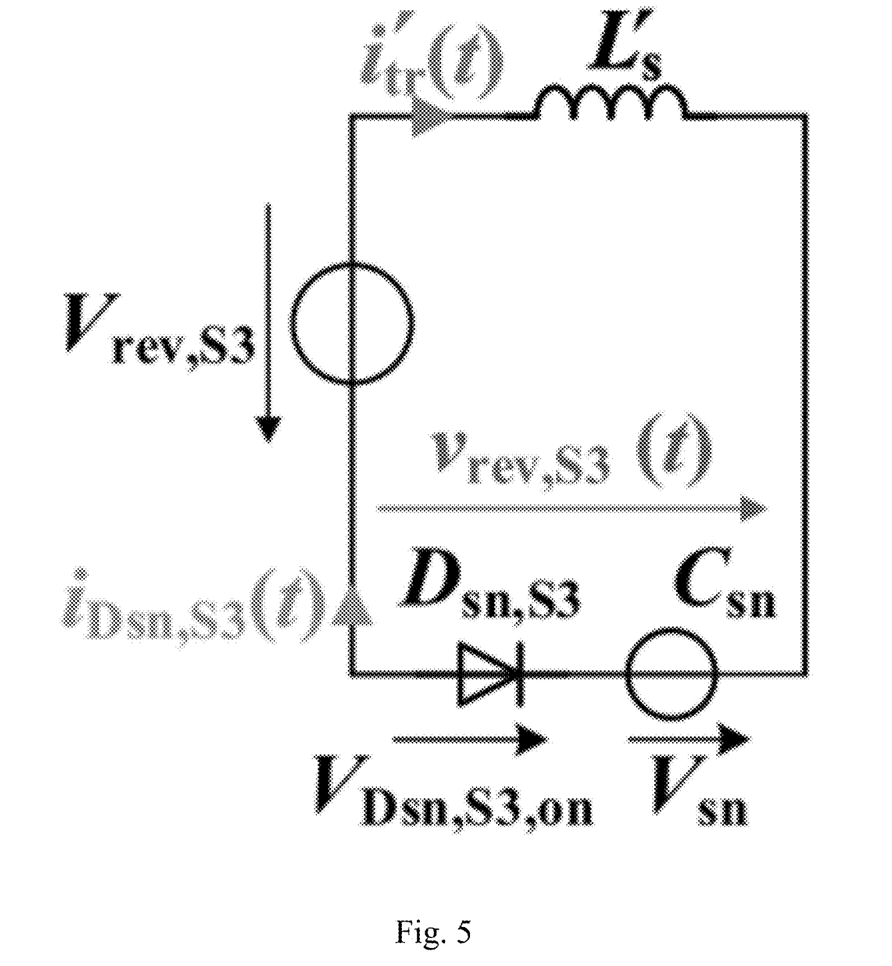
FIG. 5 shows an equivalent circuit in a clamp phase.

FIG. 3 shows the principle of operation of the regenerative snubber using the example of switch $S_3$ in a simulated behavior of the regenerative snubber. The operation can be divided into two intervals—the resonant phase and the clamp phase. In the resonant phase the current $I_{DSn}$ equals to zero. In the clamp phase $I_{DSn}$ drops sharply and rises linearly back to zero FIG. 4 and FIG. 5 show the equivalent circuits for the two intervals. $V_{rev, S3}$ denotes the steady-state blocking voltage of switch $S_3$, whereas $V_{rev, S3}(t)$ denotes the transient blocking voltage. As the capacitance of the snubber capacitor $Cs_n$ is large, $V_{sn}$ can be modeled as a voltage source.

When $S_1$ is turned off and $S_2$ is turned on, the secondary current $i_{tr}(t)$ decreases rapidly due to a short period, in which $S_3$ and $S_4$ are conducting simultaneously. As soon as the current reaches 0A, $S_3$ switches off. This initiates the resonant phase $T_{res,1}$, in which the transformer leakage inductor $L_s'$ resonates with the output capacitance $C_{oss, S3}$ of $S_3$. To obtain voltage and current during this phase, the nonlinear differential equation (1) has to be solved. Thereby, $R_{tr}$ is introduced to model the damping of the transformer T.

$$V_{rev,S3}=L_s'\ddot{Q}_{oss,S3}(t)+R_{tr}\dot{Q}_{oss,S3}(t)+v_{rev,S3}(t) \quad (1)$$

Since the output capacitance of the MOSFET is voltage dependent, the charge $Q_{oss}$ becomes a function of $V_{rev, S3}(t)$. Thus, equation (1) has to be solved iteratively. As soon as the reverse blocking voltage reaches the value $V_{sn}+V_{Dsn,on}$, the diode $D_{sn}$ conducts and, hence, clamps the reverse blocking voltage. During this clamp phase $T_{cl}$ the diode current is determined with equation (2).

$$i_{tr}(t) = i_{tr}(t=t_{cl,0}) + \frac{V_{rev,S3} + (V_{sn} + V_{Dsn,on})}{L_s'}(t - t_{cl,0}) \quad (2)$$

Consequently, the current increases and, eventually, becomes zero, which ends the clamp phase. As the current $i_{tr}(t=t_{cl,0})$, which can be obtained from the solution of equation (1), is the maximum diode current $\hat{I}_{Dsn}$, the snubber diode is chosen to withstand that peak current. During the clamp phase the charge $\Delta Q_{sn}$, $S_3$ from equation (3) is transferred to $C_{sn}$.

$$\Delta Q_{sn,S3} = \int_0^{T_{cl}} i_{Dsn}(t) \approx \frac{1}{2}\hat{i}_{Dsn}T_{cl} \quad (3)$$

$$T_{cl} = \frac{\hat{i}_{Dsn}L_s'}{(V_{rev,S3} + V_{sn} + V_{Dsn,on})} \quad (4)$$

The energy required to increase the charge $Q_0=C_{sn}V_{sn}$ of $C_{sn}$ by $\Delta Q_{Sn,S3}$ is $$E_{el,sn,S3} = \frac{1}{2}\frac{1}{C_{sn}}((Q_0 + \Delta Q_{sn,S3})^2 - Q_0^2) \quad (5)$$

Thus, the equivalent amount of energy must be drained from the capacitor by the snubber every switching cycle. This yields a partial snubber output power of $P_{sn,S3}=E_{el,S3}$ $f_{SW}$, where $f_{SW}$ denotes the switching frequency of the ACFC. The contribution $P_{sn,S4}$ to the output power from $S_4$ can be calculated likewise. Hence, the total output power of the snubber is $P_{sn}=P_{sn,S3}+P_{sn,S4}$. For the specific operation point from FIG. 6, this calculation leads to an expected total output power of approx. 15 W.

Figure 6:
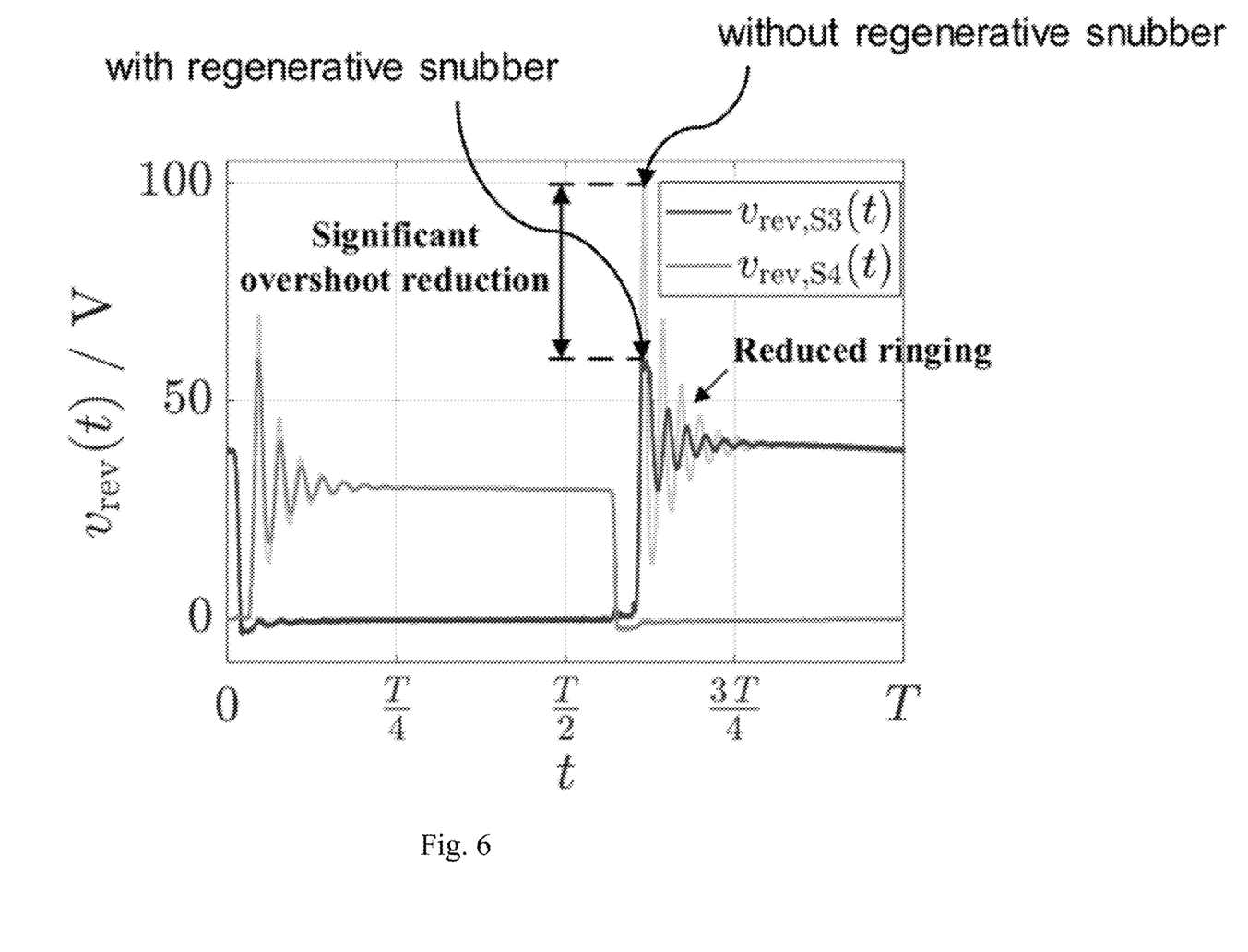
FIG. 6 shows experimentally measured blocking voltage spikes.

FIG. 6 shows experimentally measured blocking voltage spikes without the regenerative snubber and with the regenerative snubber circuit. The Fig. shows the secondary blocking voltages of the improved power converter-circuit 100 for the same operation. The regenerative snubber is able to clamp the voltage spike of the secondary blocking voltage at a predefined value of approximately 48V Thus, the regenerative snubber managed to reduce the secondary blocking voltage by approximately 50%.

This enables a proper ACFC operation within the limitation of the synchronous rectifier. In fact, it is now even possible to use synchronous rectifiers $S_3$ and $S_4$ with an 80V voltage rating instead of the former used 100V types. These MOSFETs come with lower costs and a lower on-resistance and, consequently, increase the overall efficiency of the ACFC circuit 100. A further improvement of the overall efficiency is achieved due to the regenerative nature of the snubber. Since the energy of the resonance is not dissipated in the transformer T, an efficiency improvement of approx. 0.2% is measurable. Compared to an operation where the secondary transistors are operated in avalanche, the efficiency improvement is even larger. The measured transferred power of the snubber fits the modeled results as close as 5%. Ringing and overshoots are reduced significantly.

Figure 7:
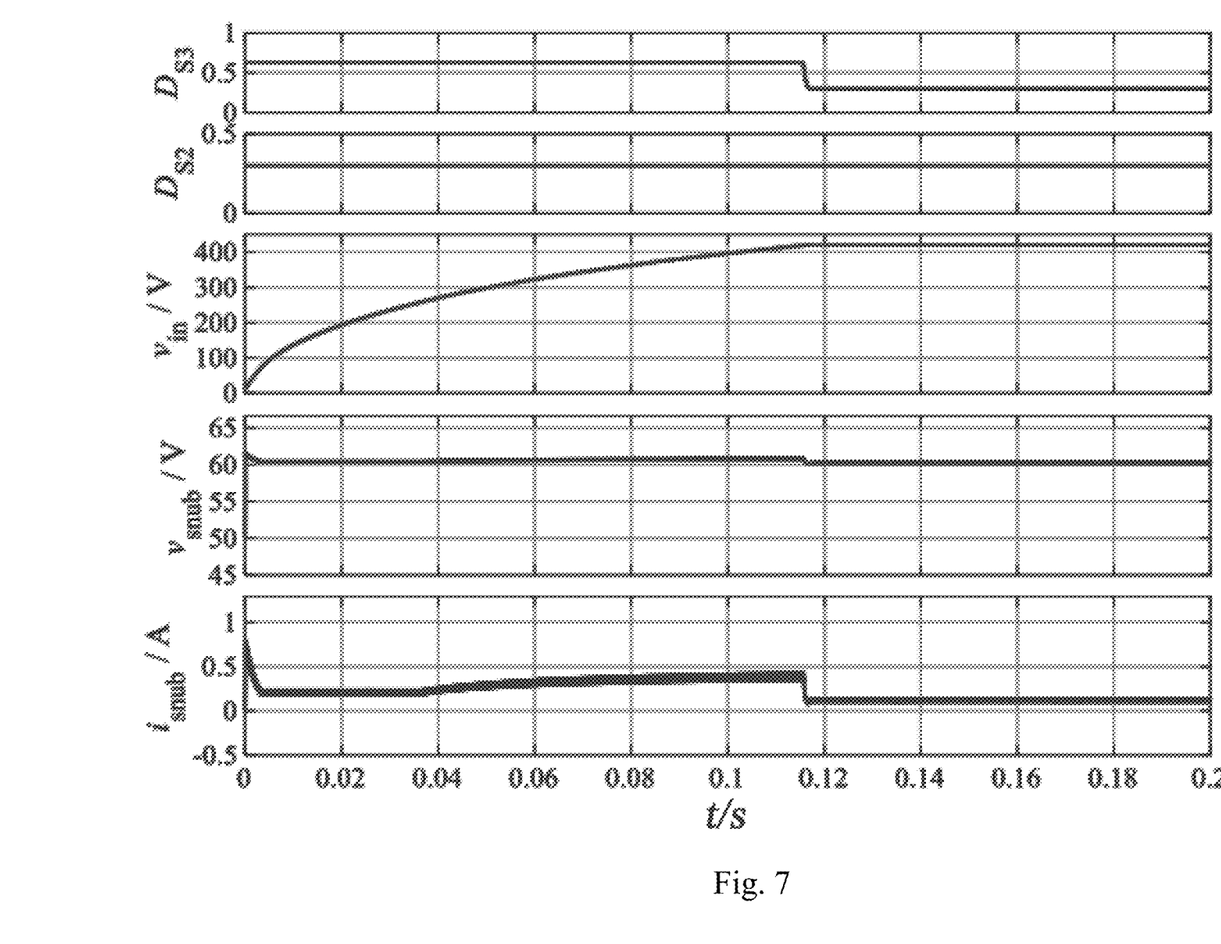
FIG. 7 shows an exemplary reverse power transfer at a given output voltage.

FIG. 7 shows exemplary reverse power transfer with an output voltage $V_{Out}$=8V and an input capacitor of 50 µF. In the power transfer, the snubber voltage is controlled to 60V. The snubber current $i_{snub}$ is used to control the snubber voltage $V_{snub}$, which is the demagnetizing voltage to the output inductor $L_g$. In addition, $V_{In}$ and $D_{s2}$ and $D_{s3}$ in dependence of the time is shown. If the snubber is utilized with a large snubber voltage, the snubber acts as a demagnetizer such that a reverse power transfer is possible. The snubber current $i_{snub}$ is the current of the buck converter.

Figure 8:
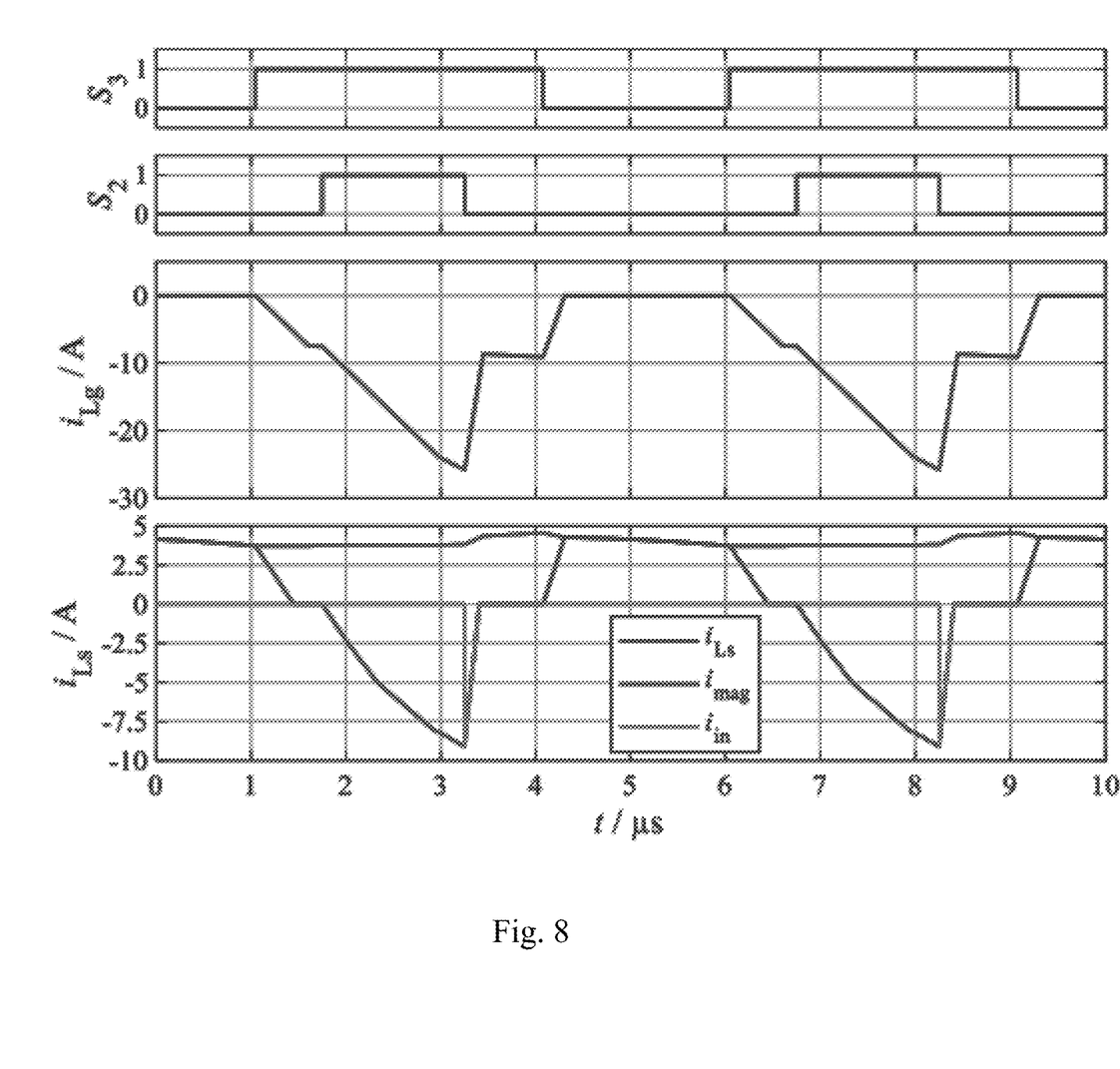
FIG. 8 shows exemplary current shapes of the reverse snubber operation.

FIG. 8 shows exemplary current shapes of the reverse snubber operation. It is shown the switching cycle of $S_2$ and $S_3$ in dependence on time t in comparison to the currents $i_{Lg}$ and $i_{Ls}$.

Figure 9:
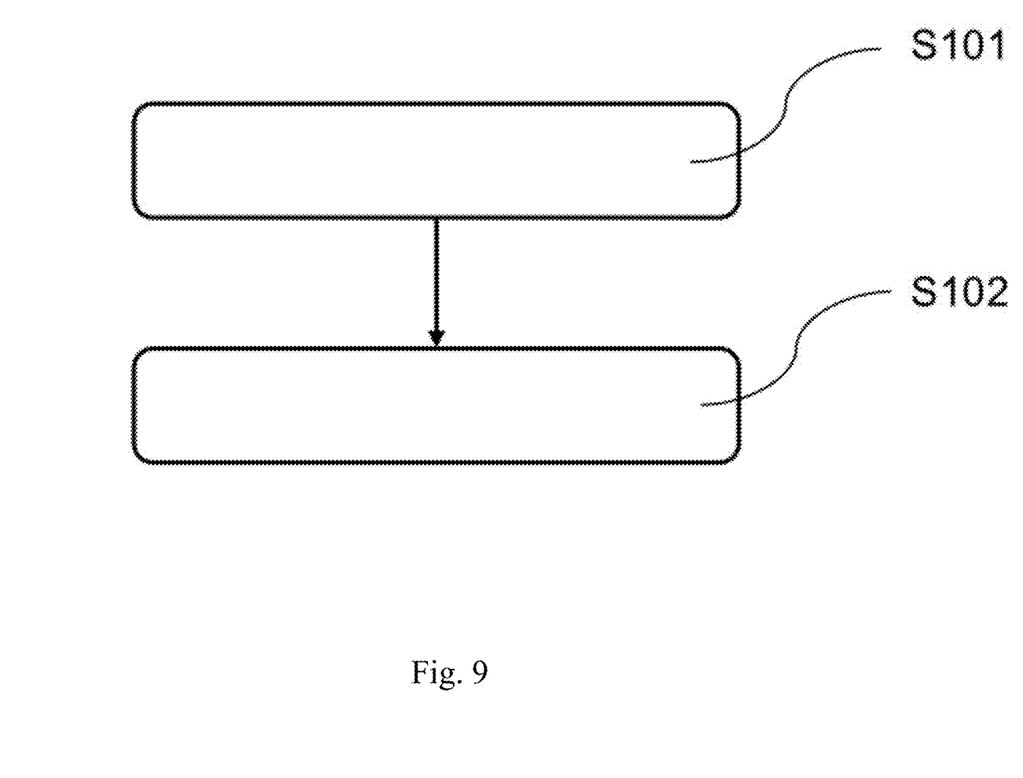
FIG. 9 shows an improved converting method.

FIG. 9 shows an improved converting method. The method includes the step S101 of suppressing voltage peaks on the secondary side of the transformer T with the snubber circuit $C_{sn}$, $D_{Sn,S3}$, $D_{Sn,S4}$ that includes a snubber capacitor $C_{sn}$. Further the method includes the step S102 of returning energy from the snubber capacitor $C_{sn}$ to the first output $V_{Out}$ of the power converter-circuit 100 by means of the auxiliary DC-DC converter 101 having the first input connected with the snubber capacitor $C_{sn}$ and the first output connected with the first output Vout of the power converter-circuit 100.

This novel regenerative snubber topology allows to clamp the secondary side blocking voltage and a proper operation of a 2.2 kW ACFC circuit 100. Furthermore, it enables the usage of more cost- and power-efficient synchronous rectifier MOSFETs with a lower blocking voltage. Since the regenerative snubber provides a lossless rejection of voltage spikes combined with a low component count, it is an efficient topology for numerous applications.

In summary, it is to be noted that the disclosure enables to provide a method as well as a circuit for increasing efficiency of electrical conversion and reducing thermal losses.

What is claimed is:

1. A power converter-circuit having a transformer, comprising:
   a snubber-circuit for suppressing voltage peaks on a secondary side of the transformer that comprises a snubber capacitor; and
   an auxiliary DC-DC converter having a first input connected with the snubber capacitor and a first output connected with a first output of the power converter-circuit;
   wherein the auxiliary DC-DC converter is a multiphase buck converter in which a number of n buck converter circuits are placed in parallel between an input and an output of the auxiliary DC-DC converter, and wherein a phase of each of the n buck converters is turned on at equally spaced intervals over a switching period.

2. The power converter-circuit according to claim 1, wherein the power converter-circuit is a DC-DC converter or a PWM-based DC-DC converter.

3. The power converter-circuit according to claim 2, wherein the power converter circuit is an Active Clamped Forward Converter.

4. The power converter-circuit according to claim 1, wherein the buck-converter comprises a transistor and a diode for controlling the current in an inductor.

5. The power converter-circuit according to claim 4, wherein the buck-converter is a synchronous buck converter comprising a synchronous rectifier.

6. The power converter-circuit according to claim 1, wherein a second input of the auxiliary DC-DC converter is connected with a ground potential.

7. The power converter-circuit according to claim 1, wherein a second output of the auxiliary DC-DC converter is connected with a ground potential.

8. The power converter-circuit according to claim 1, wherein at least one synchronous rectifier for rectifying an output voltage of the power converter-circuit is arranged on the secondary side.

9. A converting method for a power converter-circuit having a transformer, comprising the steps of:
   suppressing voltage peaks on a secondary side of the transformer with a snubber circuit that comprises a snubber capacitor;
   returning energy from the snubber capacitor to a first output of the power converter-circuit by means of an auxiliary DC-DC converter having a first input connected with the snubber capacitor and a first output connected with the first output of the power converter-circuit;
   wherein the auxiliary DC-DC converter is a multiphase buck converter in which a number of n buck converter circuits are placed in parallel between an input and an output of the auxiliary DC-DC converter; and
   turning on a phase of each of the n buck converters at equally spaced intervals over a switching period.

10. The method according to claim 9, wherein the converter circuit is an Active Clamped Forward Converter.

11. The method according to claim 9, wherein the voltage of the snubber capacitor is controlled by the auxiliary DC-DC converter.

12. The method according to claim 10, wherein the voltage of the snubber capacitor is controlled by the auxiliary DC-DC converter.

13. The method according to claim 9, wherein the current in an inductor of the auxiliary DC-DC converter is controlled by a transistor and a rectifier.

14. The method according to claim 10, wherein the current in an inductor of the auxiliary DC-DC converter is controlled by a transistor and a rectifier.

15. The method according to claim 11, wherein the current in an inductor of the auxiliary DC-DC converter is controlled by a transistor and a rectifier.

16. The method according to claim 9, wherein rectifying an output voltage of the power converter-circuit is performed by at least one synchronous rectifier arranged on the secondary side.

* * * * *